(12) United States Patent
Katsurao et al.

(10) Patent No.: US 6,686,427 B2
(45) Date of Patent: Feb. 3, 2004

(54) VINYLIDENE FLUORIDE POLYMER AND PROCESS FOR PRODUCTION THEREOF

(75) Inventors: Takumi Katsurao, Fukushima-ken (JP); Toshio Hosokawa, Fukushima-ken (JP); Katsuo Horie, Fukushima-ken (JP); Yoshikichi Teramoto, Ibaraki-ken (JP); Aisaku Nagai, Fukushima-ken (JP)

(73) Assignee: Kureha Chemical Industry Company, Limited, Tokyo (JP)

( * ) Notice: Subject to any disclaimer, the term of this patent is extended or adjusted under 35 U.S.C. 154(b) by 0 days.

(21) Appl. No.: 10/054,795

(22) Filed: Jan. 25, 2002

(65) Prior Publication Data

US 2002/0143103 A1 Oct. 3, 2002

(30) Foreign Application Priority Data

Jan. 26, 2001 (JP) ........................................ 2001-018137

(51) Int. Cl.$^7$ ................................................ C08F 14/22
(52) U.S. Cl. ....................................... 526/255; 526/206
(58) Field of Search ................................. 526/206, 255

(56) References Cited

U.S. PATENT DOCUMENTS

| 4,360,652 A | * | 11/1982 | Dohany | 526/210 |
|---|---|---|---|---|
| 4,569,978 A | * | 2/1986 | Barber | 526/206 |
| 5,237,049 A | * | 8/1993 | Cavanaugh et al. | 528/491 |
| 5,344,904 A | * | 9/1994 | Wakamori | 526/254 |
| 5,804,744 A | * | 9/1998 | Tan et al. | 73/864.34 |
| 5,925,721 A | | 7/1999 | Saito et al. | |
| 6,277,464 B1 | * | 8/2001 | Ronan et al. | 428/131 |

FOREIGN PATENT DOCUMENTS

| DE | 12 59 563 | | 1/1968 |
|---|---|---|---|
| EP | 0 591 888 | | 4/1994 |
| WO | 01 57100 | | 8/2001 |
| WO | 01/57100 | * | 9/2001 |

* cited by examiner

*Primary Examiner*—Judy M. Reddick
(74) *Attorney, Agent, or Firm*—Wenderoth, Lind & Ponack, L.L.P.

(57) ABSTRACT

A vinylidene fluoride polymer having good high-temperature coloring resistance is produced through suspension polymerization at 10–100° C. in a mixture solvent of 100 wt. parts of an aqueous medium and 10–50 wt. parts of a halogenated hydrocarbon solvent showing a good dissolving power to both a vinylidene fluoride monomer and a polymerization initiator and represented by a formula of:

$$CX_3CX_2CHX_2,$$

wherein X is a fluorine or chlorine atom, and 7 X's include 4–6 fluorine atoms and 1–3 chlorine atoms. The vinylidene fluoride polymer is characterized by an elutable total organic carbon content in pure water at 95° C. of at most 1.1 $\mu g/cm^2$.

4 Claims, No Drawings

US 6,686,427 B2

VINYLIDENE FLUORIDE POLYMER AND PROCESS FOR PRODUCTION THEREOF

FIELD OF THE INVENTION AND RELATED ART

The present invention relates to a vinylidene fluoride polymer (i.e., a homopolymer or a copolymer of vinylidene fluoride) having excellent thermal stability and a process for production thereof. More specifically, the present invention relates to a vinylidene fluoride polymer having excellent high-temperature coloring or discoloration resistance, i.e., remarkably less coloring of polymer or a shaped product thereof compared with a conventional vinylidene fluoride polymer obtained through suspension polymerization, when exposed to high temperature, and a process for production thereof.

A vinylidene fluoride polymer is a crystalline polymer and is used for providing various shaped products as a polymer having good mechanical strength. In this instance, for the purpose of providing such a shaped product with a good size stability suitable for the intended use, it has been generally practiced to subject the shaped product before the use thereof to a sufficient heat treatment (hereinafter sometimes called "aging") so as to remove a strain during the shaping and cause additional crystallization. After the aging, however, the shaped product is liable to color into yellow or brown sometimes, thus lowering the commercial value thereof. Accordingly, a hardly colorable vinylidene fluoride polymer resin has been desired, and some commercial products of improved colorability have been put on the market, but further improvements have been desired.

As processes for producing vinylidene fluoride polymers, there have been known solution polymerization, emulsion polymerization and suspension polymerization. Solution polymerization is generally performed at a polymerization temperature of 20–80° C. and at a relatively low pressure of, e.g., at most 1.5 MPa, for providing a polymer used for paint having a relatively low molecular weight of, e.g., a number-average molecular weight of at most $10^5$ corresponding to at most ca. 0.5 dl/g in terms of an inherent viscosity described hereinafter, and other polymerization processes are used for producing vinylidene fluoride polymers of higher molecular weights used for shaped products, etc. Further, because of a strong hydrogen-abstracting power of growing vinylidene fluoride radicals, the solvents usable therefor are restricted, and ketone solvents or acetate ester solvents (Japanese Laid-Open Pat. Appl'n (JP-A) 59-135257), chlorofluoroethane solvents (JP-A 6-322028), etc., have been used.

In emulsion polymerization, a chemically stable fluorine-containing emulsifier or buffer agent is used for the polymerization to obtain a polymerizate comprising a latex having small particle sizes of 0.2–0.5 μm, which is then treated with a flocculant, etc., for precipitation and particle formation to obtain polymer particles. Emulsion polymerization has an advantage of a rapid polymerization speed, but is accompanied with difficulties in convenience and production cost due to the use of an expensive emulsifier, and also difficulties, such as powder recovery through agglomeration and precipitation, and removal of ionic impurities originated from the flocculent.

Suspension polymerization is a process which has been practiced since development of initiators exhibiting polymerization initiation power at low temperatures so as to make possible polymerization at a temperature below 30.1° C. (i.e., critical temperature of vinylidene fluoride monomer). Vinylidene fluoride monomer alone or together with a copolymerizable monomer is dispersed within water, and the resultant monomer droplets are subjected to polymerization in the presence of a polymerization initiator. It is also possible to start the suspension polymerization at a temperature below 30.1° C. and then continue the polymerization by raising the temperature after formation of the particles. The suspension polymerization allows easy post-processing of the resultant polymer and is most suited for providing a vinylidene fluoride polymer excellent in processability, mechanical properties and thermal stability.

It is well known that the selection and used amount of a suspension agent, a chain transfer agent and a polymerization initiator have influences on the coloring characteristic of a vinylidene fluoride polymer obtained in the polymerization and a shaped product thereof. For example, Japanese Patent Publication (JP-B) 3-48924 has proposed a suspension polymerization process for a vinylidene fluoride polymer less liable to be colored by using a specific chain transfer agent (chain-adjusting agent), such as bis(ethyl) carbonate. However, even in the case of using such a chain transfer agent, the resultant vinylidene fluoride polymer has left a room for improvement regarding the durability, and also difficulties, such as the necessity of a high polymerization pressure and scaling on the gaseous phase wall in the polymerization vessel due to gaseous-phase polymerization.

On the other hand, JP-A 6-136008 has proposed a process for suspension-polymerizing a fluorine-containing copolymer in the presence of a halogenated hydrocarbon solvent. When this process is applied to suspension polymerization of a vinylidene fluoride polymer, the coloring resistance of the resultant vinylidene fluoride polymer cannot reach a satisfactory level.

SUMMARY OF THE INVENTION

In view of the above-mentioned problems of the prior art, a principal object of the present invention is to provide a vinylidene fluoride polymer having a high-temperature coloring resistance which has been further improved than ever.

Another object of the present invention is to provide a commercially feasible process for producing such a vinylidene fluoride polymer.

In the course of our study for achieving the above objects, we have got the following knowledge. First of all, we started to investigate causal substances of coloring in a vinylidene fluoride polymer during the high-temperature aging, and we now believe that they include decomposition products originated from additives, such as a polymerization initiator, a chain transfer agent and a suspension stabilizer, used in the suspension polymerization, low-molecular weight organic substances formed from low-molecular weight radicals by hydrogen abstraction, and oligomers formed by reaction between such additives and vinylidene fluoride monomer. It is true that such coloring-causal substances can be reduced by post-treatments, such as repetitive washing with water and drying, and also shaping at 200° C. or higher, after the suspension polymerization, and low-molecular weight organic substances that cannot be removed even by such post-treatments are believed to function as a causal substance for high-temperature coloring of vinylidene fluoride polymer. Further, we have found that such a causal substance for high-temperature coloring of vinylidene fluoride polymer is represented by an elutable total organic carbon content (hereinafter sometimes called a "TOC") measured by dipping a shaped piece of vinylidene fluoride polymer in pure water at 95° C., which provides a good correlation with the high-temperature colorability of a product vinylidene fluoride polymer. Accordingly, a vinylidene fluoride polymer having a reduced TOC provides a vinylidene fluoride polymer of excellent high-temperature coloring resistance, which is a principal objective of the present invention.

Based on the above finding, the vinylidene fluoride polymer according to the present invention is characterized by an elutable total organic content in pure water at 95° C. of at most 1.1 $\mu g/cm^2$.

According to our study, it has been also found very effective to perform a suspension polymerization of a vinylidene fluoride monomer in a mixture solvent comprising an aqueous medium and an appropriate amount of a specific halogenated hydrocarbon solvent that has a good dissolving power to both the vinylidene fluoride monomer and a polymerization initiator, and also little chain-transfer effect. Based on such finding, the process for producing a vinylidene fluoride polymer according to the present invention is characterized by suspension-polymerizing a vinylidene fluoride monomer at a polymerization temperature of 10–100° C. in a mixture solvent comprising 100 wt. parts of an aqueous medium and 10–50 wt. parts of a halogenated hydrocarbon solvent represented by a formula of.

$$CX_3CX_2CHX_2,$$

wherein X is a fluorine or chlorine atom, and 7 X's include 4–6 fluorine atoms and 1–3 chlorine atoms.

In reviewing the above-mentioned prior art in the light of our knowledge, in the suspension polymerization process of the above-mentioned JP-B 3-48924, the specific chain transfer agent per se does not exhibit a remarkable effect for improving the high-temperature coloring resistance of the product vinylidene fluoride polymer, but the expected improvement in high-temperature coloring resistance is attributable to a reduced amount of polymerization initiator by adopting a higher polymerization temperature, which necessitates a high polymerization pressure as high as at least 4.4 MPa (ca. 44 atms.) that is a critical pressure of vinylidene fluoride monomer, resulting in difficulties from apparatus viewpoint and attachment of gaseous-phase polymerizate onto the polymerization vessel wall. On the contrary, if a lower polymerization temperature is adopted in order to obviate the above difficulties, it becomes necessary to use an increased amount of polymerization initiator for completion of the polymerization, this is against the objective of the present invention to provide a vinylidene fluoride polymer having an improved high-temperature coloring resistance. (See Comparative Example 4 described hereinafter). On the other hand, the process of the above-mentioned JP-A 6-136008 uses a halogenated hydrocarbon solvent also used in the present invention for the purpose of realizing efficient suspension polymerization, and this is effective for lowering the polymerization pressure and some other purpose but the improvement in high-temperature coloring resistance of the product vinylidene fluoride polymer is not envisaged. In fact, the amount of the halogenated hydrocarbon solvent proposed to be used in the JP reference is at most 5 wt. % based on the aqueous medium, which is insufficient for achieving the objective effect of the present invention. (See Comparative Example 3 described hereinafter). In contrast thereto, in the present invention, a specific halogenated hydrocarbon solvent exhibiting a good dissolving power to both a vinylidene fluoride monomer and a polymerization initiator is used in a relatively large amount of 10–50 wt. parts per 100 wt. parts of aqueous medium, whereby it becomes possible to not only lower the polymerization pressure but also remarkably increases the efficiency of utilization of the polymerization initiator, thus allowing the production by suspension polymerization of a vinylidene fluoride polymer having remarkably reduced amount of TOC, i.e., a causal substance of high-temperature coloring, in association with remarkable reduction in amount of the polymerization initiator.

The above mentioned and other objects and features of the invention will be better understood upon consideration of the following detailed description concluding with specific Examples.

DETAILED DESCRIPTION OF THE INVENTION

Hereinbelow, some preferred embodiments of the present invention will be described successively.

The vinylidene fluoride polymer as a principal product of the present invention includes homopolymer of vinylidene fluoride and also a copolymer of vinylidene fluoride as a principal component, preferably in at least 80 wt. %, with a monomer copolymerizable with vinylidene fluoride. Examples of the monomer copolymerizable with vinylidene fluoride may include: vinyl fluoride, trifluoroethylene, tetrafluoroethylene, chlorotrifluoroethylene, hexafluoropropylene, and perfluoroalkyl vinyl ether, but these are not exhaustive. It is also possible to use a non-fluoride-containing monomer, such as ethylene, monomethyl maleate or alkyl glycidyl ether, but these are not exhaustive.

In the process of the present invention, vinylidene fluoride alone or a mixture thereof with a monomer copolymerizable therewith (hereinafter these are inclusively referred to as a "vinylidene fluoride monomer") is dispersed for suspension polymerization in a mixture medium comprising an aqueous medium in an amount of 100 wt. parts (which can be regarded as the amount of water alone while the aqueous medium can further include various additives) and a halogenated hydrocarbon solvent described below in an amount of 10–50 wt. parts. The vinylidene fluoride monomer may preferably be dispersed in a proportion of 10–60 wt. parts per 100 wt. parts of the mixture medium.

The halogenated hydrocarbon solvent used for providing the mixture dispersion medium together with the aqueous medium is represented by a polyhalogenated propane represented by a formula of:

$$CX_3CX_2CHX_2,$$

wherein X is a fluorine or chlorine atom, and 7 X's are composed of 4–6 fluorine atoms and 1–3 chlorine atoms. Among the class, it is preferred to use a monohydropentafluoro-dichloropropane having 5 fluorine atoms and 2 chlorine atoms as substituents, particularly 1,1,1,2,2-pentafluoro-3,3-dichloropropane, 1,1,2,2,3-pentafluoro-1,3-dichloropropane, or a mixture of these, from the objective effect in the present invention of reducing the amount of a polymerization initiator because of good dissolving power to both the vinylidene fluoride monomer and the polymerization initiator and also in view of mildness to the environmental problem of ozone layer destruction. It is most preferred to use 1,1,2,2,3-pentafluoro-1,3-dichloropropane exhibiting a lower chain transfer effect. Such a halogenated hydrocarbon solvent is used in a proportion of 10–50 wt. parts, preferably 15–40 wt.

parts, per 100 wt. parts of the aqueous medium. If the amount is below 10 wt. parts, the intended effect of reducing the present invention cannot be expected, and even if an amount exceeding 50 wt. parts is used, the effect of further reducing the account of the polymerization initiator cannot be achieved. For similar reasons, the halogenated hydrocarbon solvent may preferably be used in a proportion of 15–100 wt. parts, particularly 20–80 wt. parts, per 100 wt. parts of the vinylidene fluoride monomer.

Even if the polymerization temperature is set to be higher than in ordinary suspension polymerization in an aqueous medium alone, the polymerization can be formed at a pressure below the critical pressure of the present invention. More specifically, the polymerization may be performed at a temperature of 10–100° C., preferably 20–85° C. This is because the vapor pressure (partial pressure) of the monomer can be suppressed to be lower by the co-presence of the halogenated hydrocarbon solvent.

The polymerization initiator used may be a peroxydicarbonate which per se is known. It is particularly preferred to use diisopropyl peroxydicarbonate or di-normal-propyl peroxydicarbonate. The polymerization initiator may be used in a proportion of 0.005–0.25 wt. part, preferably 0.008–0.20 wt. part, per 100 wt. parts of the vinylidene fluoride monomer.

In the polymerization process of the present invention, a known chain transfer agent can be used for adjusting the molecular weight of the resultant polymer. It is possible to use, e.g., ethyl acetate, propyl acetate, acetone or diethyl carbonate. The vinylidene fluoride polymer of the present invention may preferably have an inherent viscosity (a logarithmic viscosity at 30° C. of a solution of 4 g of a polymer in 1 liter of N,N-dimethylformamide) of at least 0.6 dl/g, particularly 0.8–1.5 dl/g, so as to provide a molecular weight suitable as a material for providing shaped product.

The vinylidene fluoride polymer produced according to the present invention and a shaped product thereof are extremely free from coloring and provide a white appearance even after the aging thereof. This is presumably attributable to a remarkable reduction in used amount of the polymerization initiator than a conventional level by the co-use of the halogenated hydrocarbon solvent in addition to the aqueous medium. Further, it has been confirmed that the vinylidene fluoride polymer obtained through the polymerization process of the present invention exhibits an elutable total organic carbon content (TOC) and an elutable fluorine ion content (as measured according to an elution test for a press-molded piece as described in Examples presented hereinafter) are substantially lower than those of a vinylidene fluoride polymer obtained according to a conventional polymerization process.

Further, the production process of the present invention is free from attachment of or clogging with the polymer on the upper inner wall portion of the polymerization vessel contacting the gaseous phase of the polymerization system or at the pressure gauge line and monomer charge line, thus providing ancillary but great advantages in polymerization operation and maintenance of the polymerization vessel. In a conventional suspension polymerization system, a subsequent batch of polymerization operation has to be started after complete removal of such attached or clogging materials at lines, it has been necessary to pay a great care in maintaining the quality and preventing the lowering in productivity of the product polymer.

EXAMPLES

Hereinbelow, the present invention will be described more specifically based on Examples and Comparative Examples.

Example 1

Into an autoclave having an inner volume of 2 liters, 1024 g of deionized water, 160 g of 1,1,2,2,3-pentafluoro-1,3-dichloropropane, 0.30 g of methyl cellulose, 10 g of ethyl acetate, 0.12 g of diisopropyl peroxydicarbonate and 240 g of vinylidene fluoride, were charged, and the system was raised in temperature up to 60° C. in 2 hours. From 0.5 hour thereafter, 240 g of vinylidene fluoride was gradually added to the system so as to maintain a polymerization pressure of 4.15 MPa–4.17 MPa. Thereafter, the polymerization was continued at 60° C. to effect suspension polymerization for totally 12 hours from the start of the temperature raising. After completion of the polymerization, the polymerizate slurry was de-watered, washed with water and dried at 80° C. for 20 hours to obtain powdery Polymer A. The polymerization yield was 95%, and the product Polymer A exhibited an inherent viscosity of 0.99 dl/g. Incidentally, no attachment of or clogging with polymer was found in the polymerization vessel or at connecting lines during or after the polymerization.

Example 2

The operation of Example 1 was repeated in a similar manner except that the amounts of methyl cellulose and diisopropyl peroxydicarbonate were each reduced to 2/3, i.e., 0.20 g and 0.08 g, respectively, to effect suspension polymerization for totally 23 hours from the start of the temperature raising. After completion of the polymerization, the polymerizate slurry was de-watered, washed with water and dried at 80° C. for 20 hours to obtain powdery Polymer B. The polymerization yield was 91%, and the product Polymer B exhibited an inherent viscosity of 1.04 dl/g. Incidentally, no attachment of or clogging with polymer was found in the polymerization vessel or at connecting lines during or after the polymerization.

Comparative Example 1

Into an autoclave having an inner volume of 2 liters, 1024 g of deionized water, 0.20 g of methyl cellulose, 11.2 g of ethyl acetate, 2.0 g of diisopropyl peroxydicarbonate and 400 g of vinylidene fluoride, were charged, and the system was raised in temperature up to 26° C. in 1 hour to effect suspension polymerization for 25.5 hours from the start of the temperature raising. After completion of the polymerization, the polymerizate slurry was de-watered, washed with water and dried at 80° C. for 20 hours to obtain powdery Polymer C. The polymerization yield was 88%, and the product Polymer C exhibited an inherent viscosity of 1.03 dl/g. Incidentally, some attachment of polymer was observed in the polymerization vessel and at connection lines after the polymerization.

Comparative Example 2

The same starting materials and additives were charged in the same amounts into a 2 liter-autoclave as in Example 1 except for using 1,1-dichloro-1-fluoroethane (used in JP-A 6-33208 as a solvent for solution polymerization) instead of the 1,1,2,2,3-pentafluoro-1,3-dichloro-propane, and then the system was raised in temperature up to 60° C. in 2 hours. From 1 hour thereafter, 240 g of vinylidene fluoride was gradually added to the system so as to maintain a polymerization pressure of 3.92 MPa–3.94 MPa. Thereafter, the polymerization was continued at 60° C. to effect suspension polymerization for totally 23 hours from the start of the temperature raising. After completion of the polymerization, the polymerizate slurry was de-watered, washed with water and dried at 80° C. for 20 hours to obtain powdery Polymer D. The polymerization yield was 89%, and the product Polymer D exhibited an inherent viscosity of 1.09 dl/g.

Comparative Example 3

Into a 2 liter-autoclave, 1024 g of deionized water, 40 g of 1,1,2,2,3-pentafluoro-1,3-dichloropropane, 0.20 g of methyl cellulose, 12 g of ethyl acetate, 0.40 g of diisopropyl peroxydicarbonate and 400 g of vinylidene fluoride, were charged, and the system was raised in temperature up to 35° C. to effect polymerization at 35° C. for 5 hours. Thereafter, the system was raised in temperature from 35° C. to up to 60° C. in 3.5 hours, and subjected to polymerization for further 0.5 hour after reaching 60° C. After completion of the polymerization, the polymerizate slurry was de-watered, washed with water and dried at 80° C. for 20 hours to obtain powdery Polymer E. The polymerization yield was 89%, and the product Polymer E exhibited an inherent viscosity of 1.08 dl/g.

Comparative Example 4

Into a 2 liter-autoclave, 1024 g of deionized water, 0.20 g of methyl cellulose, 4.9 g of diethyl carbonate, 2.0 g of diisopropyl peroxydicarbonate and 400 g of vinylidene fluoride, were charged, and the system was raised in temperature up to 26° C. in 1 hour to effect suspension polymerization for 30 hours from the start of the temperature raising. After completion of the polymerization, the polymerizate slurry was de-watered, washed with water and dried at 80° C. for 20 hours to obtain powdery Polymer F. The polymerization yield was 88%, and the product Polymer F exhibited an inherent viscosity of 1.01 dl/g. Incidentally, some attachment of polymer was observed in the polymerization vessel and at connection lines after the polymerization.

The vinylidene fluoride polymers (Polymers A–F) prepared in the above Examples and Comparative Examples were respectively subjected to the following tests for colorability and elution of press-molded pieces.

Colorability

Each powdery vinylidene fluoride polymer sample or a cut sheet sample (having sizes of ca. 20 mm×20 mm×0.5 mm) cut out from a sheet formed by pressing such a powdery polymer sample at 215° C., was placed in an amount of 130 g in a SUS (stainless steel)-made pot and, after being hermetically sealed, was placed still in a Geer oven at 250° C. for 1.5 hours to form a molten sample. The pot was then cooled in air down to room temperature, and the resultant lump sample was taken out of the pot and subjected to measurement of color tone by a color difference meter ("ZE-2000", made by Nippon Denshoku K.K.). Then, the lump sample was further subjected to aging in a Geer oven at 170° C. for 9 hours, followed by a similar color tone measurement.

The color tone was judged while noting a YI-value (yellowness index) and an L-value (Hunter's brightness index) with reference to ASTM D 1925. A smaller YI-value and a larger L-value are preferred regardless of before or after the aging.

The results of the measurements for the above-prepared Polymers A–F are inclusively shown in Table 1 below together with those of some commercial vinylidene fluoride polymer products of improved colorability-grade.

TABLE 1

Color tone values before and after aging (at 170° C. for 9 hours)

| Sample | Before aging | | After aging | |
|---|---|---|---|---|
| Lump of melted powder | YI | L | YI | L |
| Polymer A (Ex. 1) | −15 | 56 | −17 | 48 |
| Polymer B (Ex. 2) | −12 | 52 | −3 | 44 |
| Polymer C (Comp. Ex. 1) | −4 | 53 | 12 | 46 |
| Polymer D (Comp. Ex. 2) | 8 | 50 | 34 | 32 |
| Polymer E (Comp. Ex. 3) | −4 | 53 | 16 | 39 |
| Polymer F (Comp. Ex. 4) | 3 | 50 | 28 | 39 |
| Commercial product K* | −23 | 56 | 16 | 47 |
| Commercial product S* | 17 | 52 | 30 | 46 |

*Commercial product K: "Kynar 1000 HD" (made by ATOFINA S.A.)
Commercial product S: "Solef 6010" (made by Solvay & Cie.)

(Elution Test for Pressed Sheet)

Each powdery vinylidene fluoride polymer sample was pressed at 220° C. into a sheet, from which 6 cut samples (each having sizes of ca. 10 mm×50 mm×1 mm) were cut out and placed in a polytetrafluoroethylene-made bottle for dipping within pure water (with a resistivity of at least 1 M ohm.cm) for 1 hour at room temperature. Then, the cut samples were further subjected to ten times of surface-washing with pure water. Then, the cut sheet samples were transferred into a polytetrafluoroethylene-made bottle equipped with a lid together with 80 ml of pure water added thereto. After being covered with the lid, the bottle was left standing at 95° C. for 6 days. Thereafter, the water in the bottle was subjected to measurement of TOC concentration by a total organic carbon meter (measurement lower limits= 0.05 $\mu g/cm^2$) and fluorine ion concentration by ion chromatography (measurement lower limit=0.01 $\mu g/cm^2$), to obtain an eluted amount per unit surface area of the 6 pressed and cut sheet samples. The measured results are inclusively shown in Table 2 below.

TABLE 2

Eluted amounts of TOC and F⁻

| Vinylidene fluoride polymer | TOC ($\mu g/cm^2$) | F⁻ ($\mu g/cm^2$) |
|---|---|---|
| Polymer A (Ex. 1) | 0.9 | 0.08 |
| Polymer C (Comp. Ex. 1) | 2.4 | 0.98 |
| Polymer D (Comp. Ex. 2) | 2.0 | 0.90 |
| Polymer E (Comp. Ex. 3) | 1.6 | 0.41 |
| Polymer F (Comp. Ex. 4) | 2.9 | 0.96 |
| Commercial product K | 1.2 | 0.12 |
| Commercial product S | 2.5 | 0.15 |

As is apparent in view of the results shown in Tables 1 and 2 in parallel with the description of Examples and Comparative Examples, by effecting suspension polymerization of a vinylidene fluoride monomer in a mixture solvent comprising an aqueous medium and an appropriate amount of a specific halogenated hydrocarbon solvent showing a good dissolving power to both the vinylidene fluoride monomer and a polymerization initiator according to the present invention, it becomes possible to produce a vinylidene fluoride polymer having excellent high-temperature coloring resistance due to extremely small elutable total organic carbon content (and elutable fluorine ion content) as a causal substance of high-temperature coloring under commercially feasible production conditions.

What is claimed is:
1. A vinylidene fluoride polymer, having an elutable total organic carbon content in pure water at 95° C. of at most 1.1

μg/cm² and a high-temperature coloring resistance as to exhibit a yellowness index of at most −3 and Hunter's brightness index of at least 44 according to ASTM D1925 after being subjected to aging at 170° C. for 9 hours.

2. A vinylidene fluoride polymer according to claim 1, having an elutable fluorine ion content in pure water at 95° C. of at most 0.10 μg/cm².

3. A vinylidene fluoride polymer according to claim 1, comprising vinylidene fluoride homopolymer or a copolymer of at least 80 wt. % of vinylidene fluoride with a monomer copolymerizable therewith.

4. A vinylidene fluoride polymer according to claim 1, having an inherent viscosity of at least 0.6 dl/g as measured at a concentration of 4 g/liter in dimethylformamide at 30° C.

* * * * *